(12) United States Patent
Okamoto et al.

(10) Patent No.: US 7,764,318 B2
(45) Date of Patent: Jul. 27, 2010

(54) PHOTOGRAPHING APPARATUS HAVING A WHITE BALANCE ADJUSTMENT FUNCTION

(75) Inventors: Teppei Okamoto, Saitama (JP); Shigenori Fujio, Saitama (JP); Satoru Horita, Tochigi (JP); Toshihiro Hamamura, Tokyo (JP)

(73) Assignee: Hoya Corporation, Tokyo (JP)

( * ) Notice: Subject to any disclaimer, the term of this patent is extended or adjusted under 35 U.S.C. 154(b) by 307 days.

(21) Appl. No.: 11/853,902

(22) Filed: Sep. 12, 2007

(65) Prior Publication Data

US 2008/0062273 A1    Mar. 13, 2008

(30) Foreign Application Priority Data

Sep. 13, 2006    (JP) .............................. 2006-247959

(51) Int. Cl.
*H04N 5/225*    (2006.01)
*H04N 9/73*    (2006.01)

(52) U.S. Cl. .............................. 348/333.11; 348/223.1

(58) Field of Classification Search .............. 348/223.1, 348/224.1, 225.1, 333.01, 333.02, 333.11, 348/333.12
See application file for complete search history.

(56) References Cited

U.S. PATENT DOCUMENTS

| | | | |
|---|---|---|---|
| 6,954,228 B1 * | 10/2005 | Acharya et al. .......... | 348/223.1 |
| 2003/0011686 A1 * | 1/2003 | Higuchi ................... | 348/223.1 |
| 2004/0201726 A1 * | 10/2004 | Bloom et al. ............ | 348/223.1 |
| 2004/0246360 A1 * | 12/2004 | Stavely et al. .......... | 348/333.11 |
| 2005/0013605 A1 * | 1/2005 | Kubo ......................... | 396/374 |
| 2005/0206965 A1 * | 9/2005 | Nakayama et al. .......... | 358/453 |
| 2006/0007322 A1 * | 1/2006 | Nakamura et al. ....... | 348/222.1 |
| 2006/0087566 A1 * | 4/2006 | Abe ......................... | 348/223.1 |
| 2007/0188644 A1 | 8/2007 | Okamoto | |

FOREIGN PATENT DOCUMENTS

| | | |
|---|---|---|
| JP | 63314424 | 12/1988 |
| JP | 2004304695 | 10/2004 |

OTHER PUBLICATIONS

English language Abstract of JP 2004-304695.
U.S. Appl. No. 11/853,984 to Hamamura, which was filed on Sep. 12, 2007.

* cited by examiner

*Primary Examiner*—Jason Whipkey
(74) *Attorney, Agent, or Firm*—Greenblum & Bernstein, PLC (57) ABSTRACT

A photographing apparatus comprises an imaging sensor, a memory, and a display unit. The imaging sensor obtains image data. The memory stores the image data. The display unit indicates a still picture based on the image data and a white balance setting picture on the still picture. The white balance setting picture is used for setting a white balance gain in a white balance adjustment.

12 Claims, 9 Drawing Sheets

PHOTOGRAPHING APPARATUS HAVING A WHITE BALANCE ADJUSTMENT FUNCTION

BACKGROUND OF THE INVENTION

1. Field of the Invention

The present invention relates to a photographing apparatus, and in particular to the indication of a picture that is used for setting a white balance gain.

2. Description of the Related Art

A photographing apparatus in which the setting for the white balance gain of the image data can be fine-tuned is proposed.

In the photographing apparatus such as shown in Japanese unexamined patent publication (KOKAI) No. S63-314424, an adjustment can be made to the white balance gain.

However, an image processing setting picture that is used for setting the quantity of an adjustment in an image processing operation, such as a white balance adjustment etc., is indicated on an image that is a moving picture. The image is indicated to confirm the effect of setting the quantity of adjustment in the image processing operation. Because of the moving picture, it is difficult to accurately set the quantity of adjustment in the image processing operation that is suitable to the photographing subject of the photographing operation that will be performed.

SUMMARY OF THE INVENTION

Therefore, an object of the present invention is to provide a photographing apparatus so that the quantity of adjustment in the image processing operation that is suitable to the photographing subject can be set.

According to the present invention, a photographing apparatus comprises an imaging sensor, a memory, and a display unit. The imaging sensor obtains image data. The memory stores the image data. The display unit indicates a still picture based on the image data and a white balance setting picture on the still picture. The white balance setting picture is used for setting a white balance gain in a white balance adjustment.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention is described below with reference to the embodiment shown in the drawings. In this embodiment, the photographing apparatus 1 is a digital camera.

Figure 1:
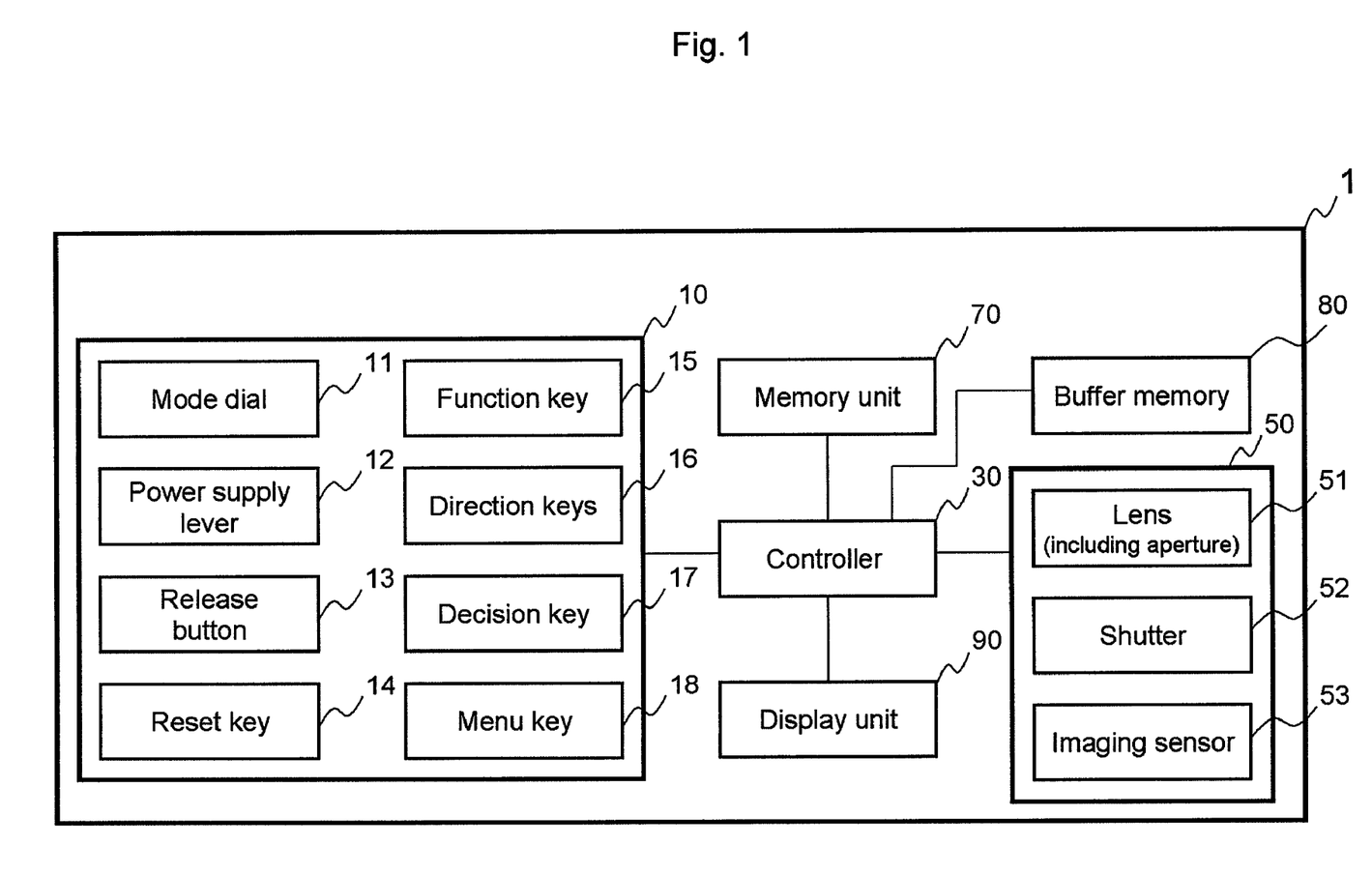
FIG. 1 is a construction figure of the photographing apparatus in the embodiment.

The imaging part of the photographing apparatus 1 comprises an operation unit 10, a controller 30, a photographing unit 50, a memory unit 70, a buffer memory 80, and an display unit 90 (see FIG. 1).

Figure 2:
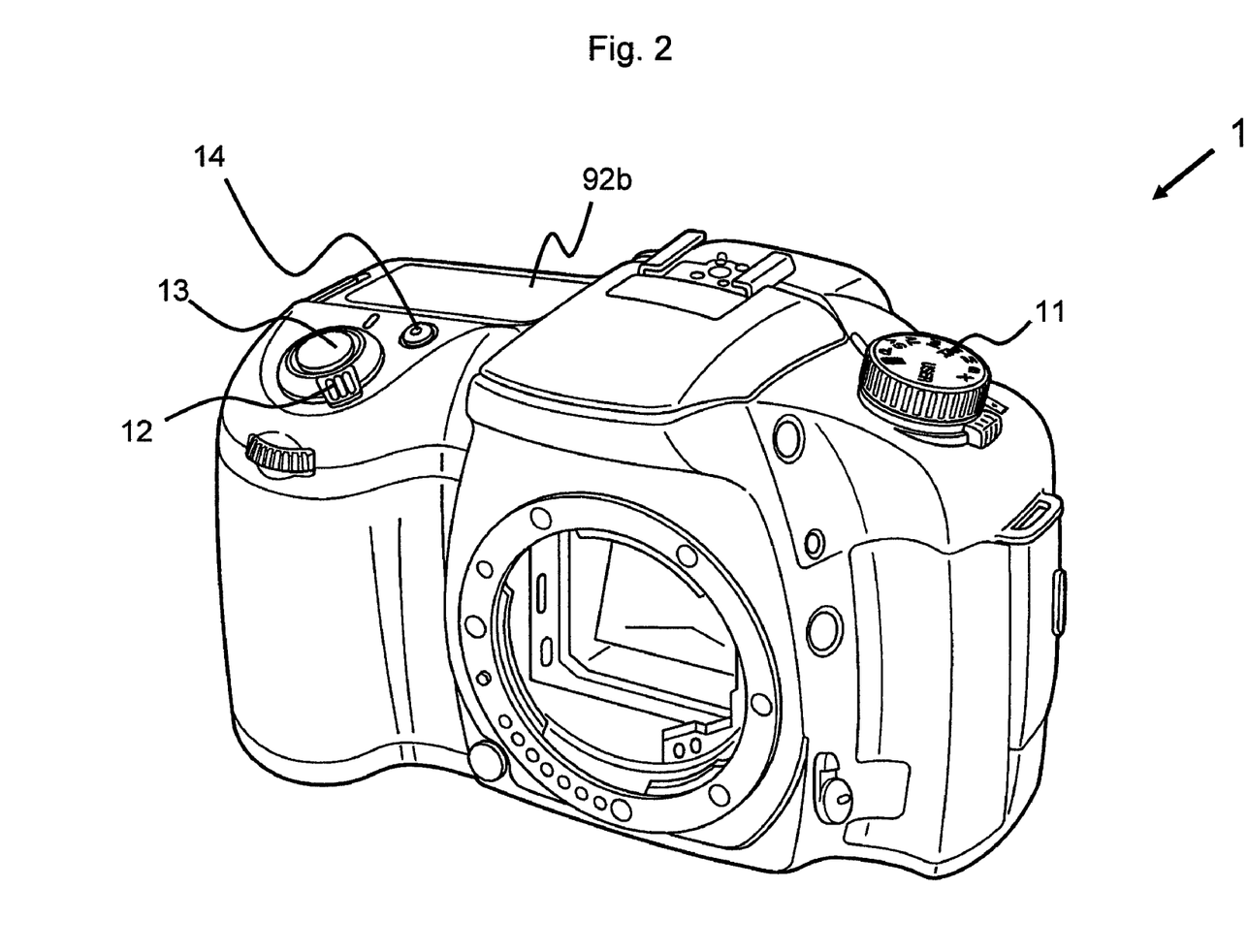
FIG. 2 is a perspective front view of the photographing apparatus.
Figure 3:
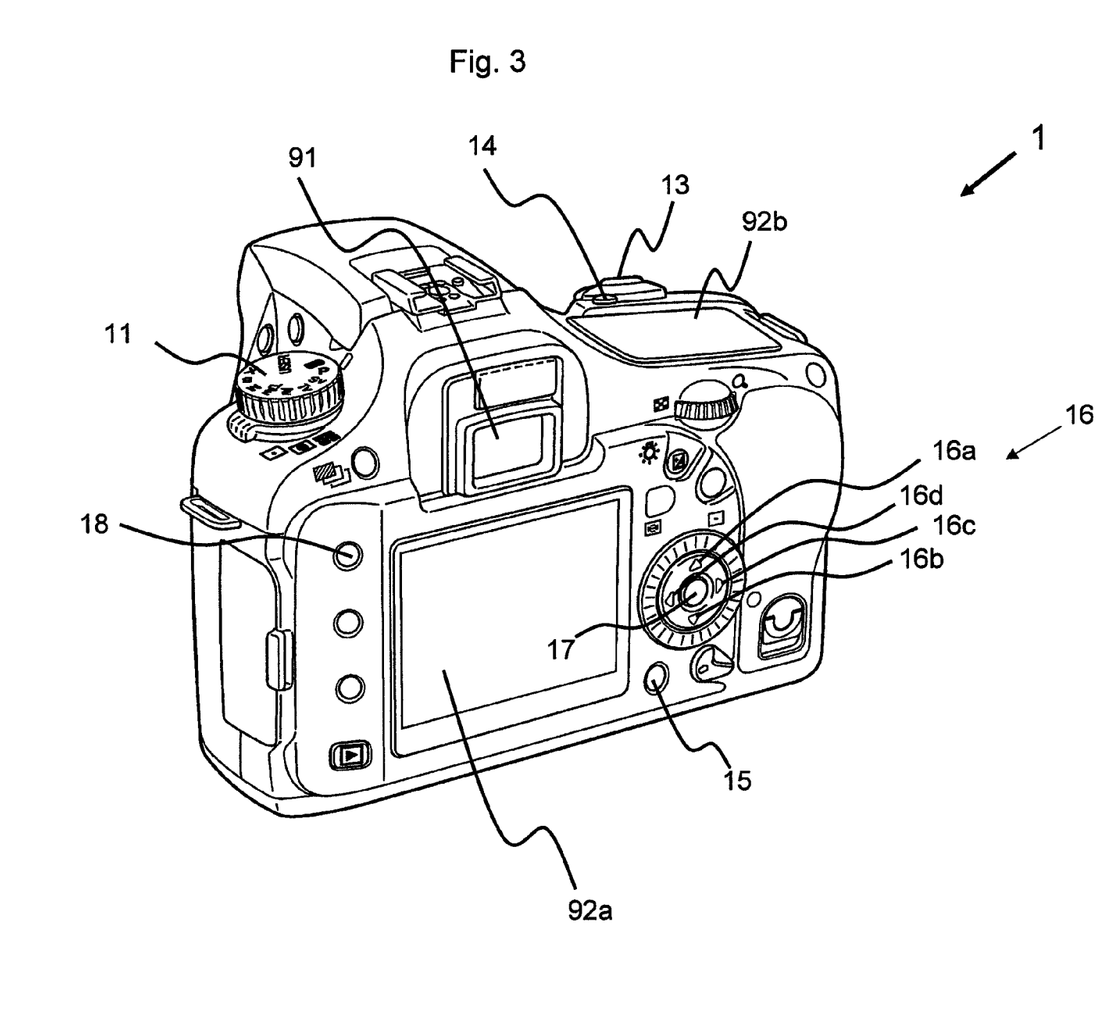
FIG. 3 is a perspective rear view of the photographing apparatus.

The operation unit 10 has a mode dial 11, a power supply lever 12, a release button 13, a reset key 14, a function key 15, direction keys 16, a decision key 17, and a menu key 18 (see FIGS. 1 to 3).

The photographing unit 50 has a lens 51 including an aperture, a shutter, 52, and an imaging sensor 53 such as a CCD etc.

The display unit 90 has an optical finder 91, a first display 92a, and a second display 92b.

In a photographing operation, when the release button 13 is fully depressed, the photographic subject image is captured as an optical image through the lens 51 and the shutter 52 by the imaging sensor 53 so that the image obtained by the photographing operation is displayed on the first display 92a and the image data obtained by the photographing operation is stored in the memory unit 70. The photographic subject image through the lens 51 can be optically observed through the optical finder 91.

In the photographing operation, when the power supply lever 12 is moved to a preview position (not depicted), the photographic subject image is captured as an optical image through the lens 51 and the shutter 52 by the imaging sensor 53 so that the image obtained by the photographing operation is displayed on the first display 92a and the image data obtained by the photographing operation is temporarily stored in the buffer memory 80. However, the image data is not stored in the memory unit 70.

The image data that is temporarily stored in the buffer memory 80 is used for a preview indication and is used as a confirmation image (a preview image) for a first white balance setting picture and a second white balance setting picture.

The first white balance setting picture is used for setting the white balance gain (selecting the white balance mode) in the white balance adjustment of the image data. The second white balance setting picture is used for setting the fine adjustment of the white balance gain of the selected white balance mode.

The mode dial 11 is used for selecting the exposure mode, such as an aperture priority AE mode or a shutter speed priority AE mode etc. The mode dial 11 is rotated so that the exposure mode corresponding to a mode mark that is adjusted to a dial selection position (not depicted) by the rotating operation of the mode dial 11 is an exposure mode in which the photographing apparatus 1 is set.

The power supply lever 12 is a lever that is arranged on a front grip part of the photographing apparatus 1 and is arranged around the release button 13, where the power supply lever 12 can be rotated by the user's right forefinger etc., while holding the photographing apparatus 1.

When the power supply lever 12 is rotated to an ON position that is one of the predetermined positions, the photographing apparatus 1 is set to the ON state.

When the power supply lever 12 is rotated to an OFF position that is one of the predetermined positions, the photographing apparatus 1 is set to the OFF state.

When the power supply lever 12 is rotated to the preview position that is one of the predetermined positions, the photographing operation for temporarily storing the image data to the buffer memory 80 (a preview indication operation) is performed.

When the release button 13 is partially depressed by the user, the photometric switch (not depicted) changes to the ON state so that the photometric operation is performed by an AE sensor (not depicted), and the AF sensing operation and the focusing operation are performed by the AF sensor (not depicted).

When the release button 13 is fully depressed by the user, the release switch (not depicted) changes to the ON state so that the photographing operation is performed. The image, which is captured, is indicated on the first display 92a and the image data is stored in the memory unit 70.

The image that is captured in the photographing operation when the release button 13 is fully depressed, may be a still picture or a moving picture.

An operation for setting a white balance gain, which is a gain in a white balance adjustment, is fine-tuned by the user operating the function key 15, the direction keys 16, and the decision key 17.

The reset key 14 and the menu key 18 are used for making a fine adjustment to the white balance gain.

The reset key 14 is a button that is arranged on the front grip part of the photographing apparatus 1 and is arranged near the release button 13. When the reset key is depressed by the user's right forefinger etc., while holding the photographing apparatus 1, under the condition where the second white balance setting picture is indicated and the fine adjustment of the white balance is carried out (see FIGS. 8 and 9), a parameter indicating that the fine adjustment has been made to the white balance gain is reset so that the white balance gain is returned to the previous white balance gain before the fine adjustment was made. In other words, a GM compensation value and a BA compensation value are reset.

The function key 15 is arranged on a lower right rear surface of the photographing apparatus 1. The direction keys 16 are comprised of an up-direction key 16a, a down-direction key 16b, a right-direction key 16c, and a left-direction key 16d, and are arranged on a right rear surface of the photographing apparatus 1 where the direction keys 16 surround the decision key 17.

When the function key 15 is depressed, a function setting picture (not depicted) is indicated on the first display 92a. When the left-direction key 16d is depressed, the first white balance setting picture is indicated on the first display 92a (see FIGS. 6 and 7).

Figure 8:
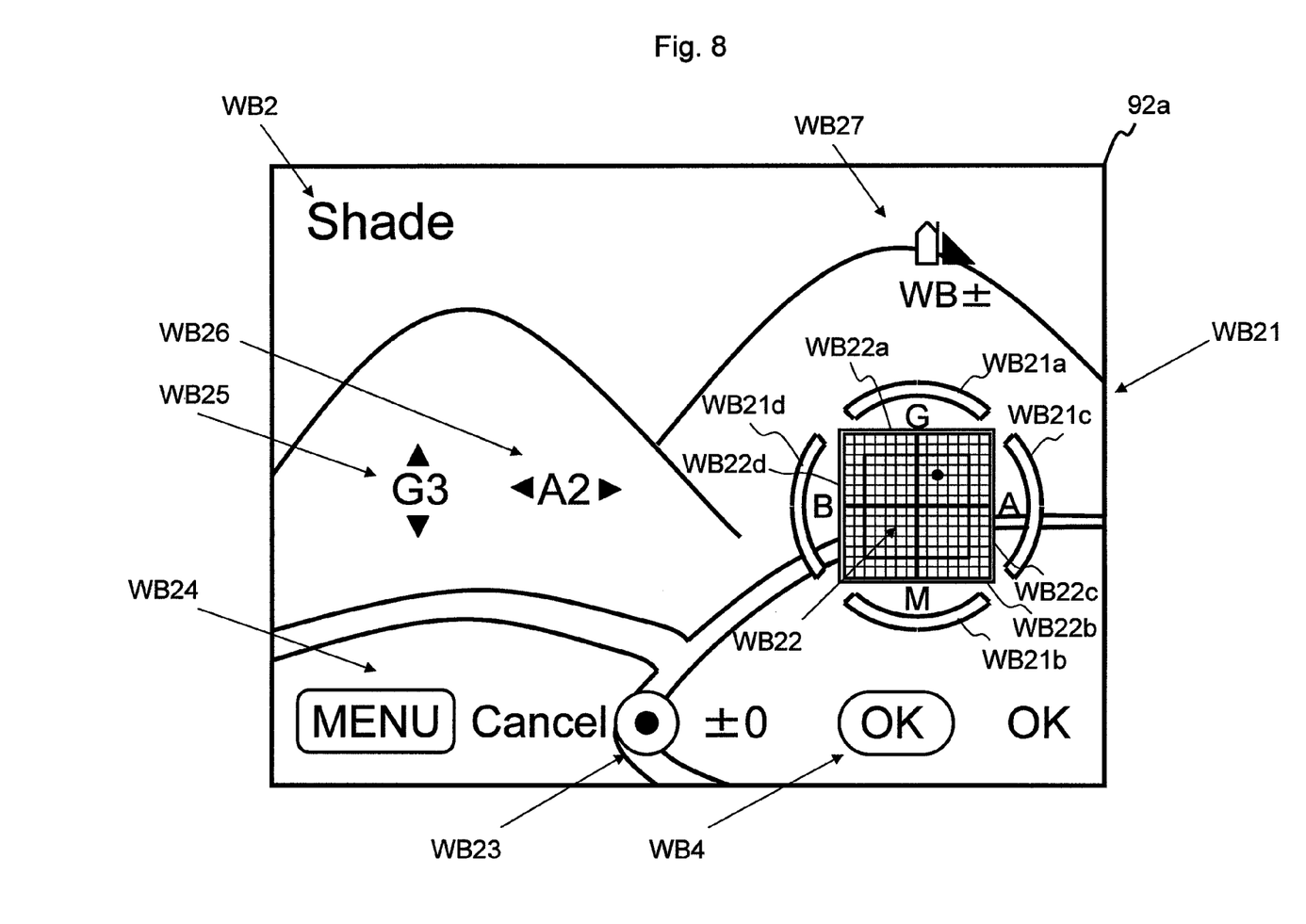
FIG. 8 is the display content of the second white balance setting picture and the preview image.
Figure 9:
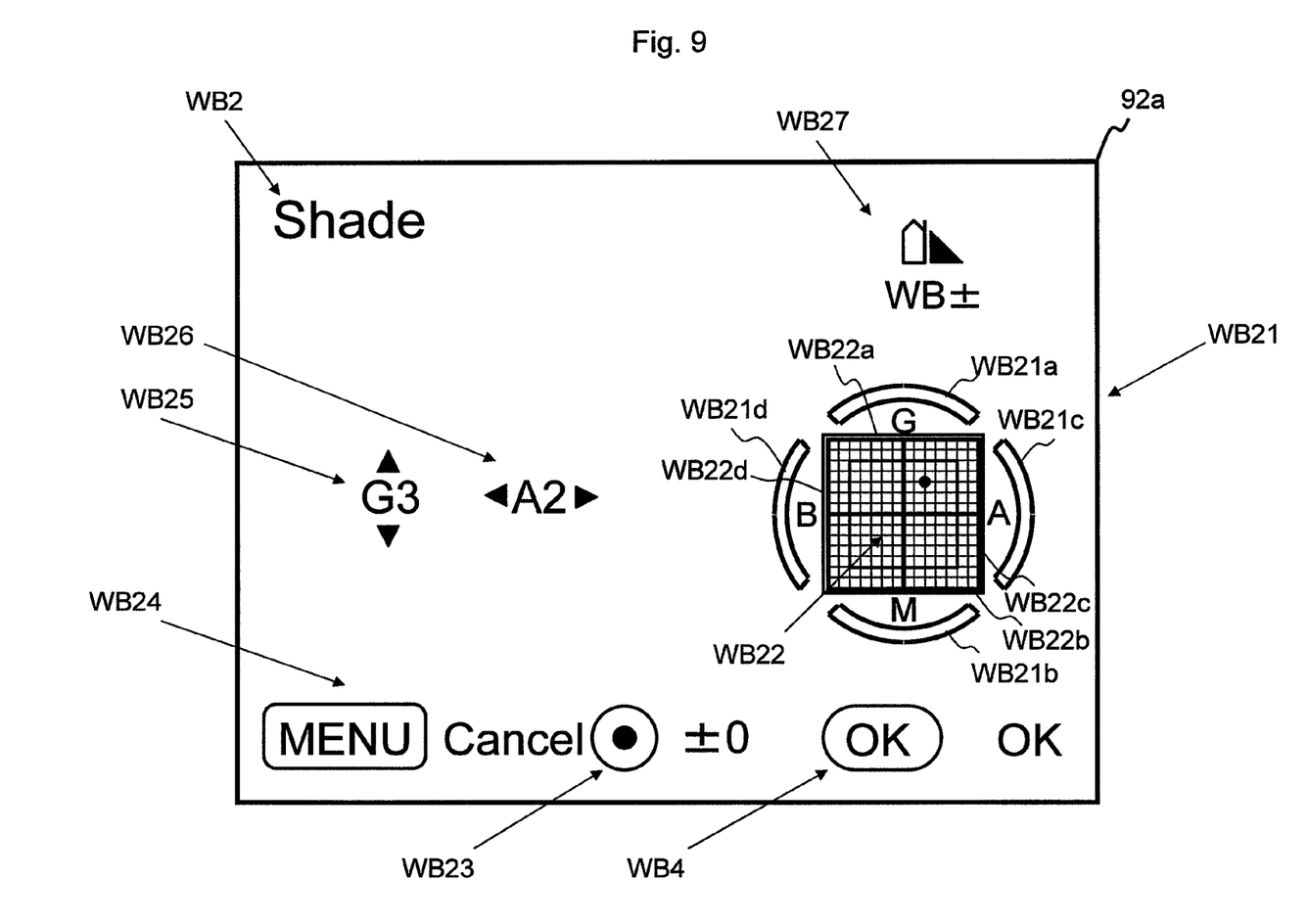
FIG. 9 is the display content of the second white balance setting picture without the preview image.

When the right-direction key 16c is depressed under the condition where the first white balance setting picture is indicated, the second white balance setting picture is indicated on the first display 92a (see FIGS. 8 and 9).

The decision key 17 is used for determining the setting state of the white balance (the white balance gain) that is set by operating the direction keys 16.

When the decision key 17 is depressed under the condition where the first white balance setting picture is indicated, the white balance gain is determined on the basis of a white balance mode that is selected by the user. The indication is then switched from the first white balance setting picture to the function setting picture.

The selected white balance mode is surrounded by a rectangular frame on the first white balance setting picture.

When the decision key 17 is depressed under the condition where the second white balance setting picture is indicated, the quantity of the fine adjustment of the white balance of the selected white balance mode is determined on the basis of the position of a cursor in an adjustment quantity indication area WB22 of the second white balance setting picture. The indication is then switched from the second white balance setting picture to the first white balance setting picture.

In the fine adjustment made to the white balance, an adjustment to the tone of the colors between green and magenta, and an adjustment to the tone of the colors between blue and amber are fine-tuned.

The menu key 18 is a button that is arranged on a left rear surface of the photographing apparatus 1 and is used when the fine adjustment is made to the white balance under the condition where the second white balance setting picture is indicated.

When the menu key 18 is depressed under the condition where the second white balance setting picture is indicated, the indication is switched from the second white balance setting picture to the first white balance setting picture without determining the quantity of the fine adjustment made to the white balance of the selected white balance mode on the basis of the position of the cursor in the adjustment quantity indication area WB22 of the second white balance setting picture.

Further, the menu key may be used as a start button for making an adjustment to the image quality.

The controller 30 is a control apparatus that controls each part of the photographing apparatus 1 regarding the photographing operation. In particular, the controller 30 changes the setting state of the white balance corresponding to the operation of the operation unit 10 when setting the white balance gain, including the fine adjustment, is carried out. Further, when the preview indication operation is performed, the controller 30 performs the white balance adjustment on the still picture that is indicated in the preview indication operation, on the basis of the setting state of the white balance. Further, the controller 30 performs the indication of the information regarding the setting state of the white balance (the indications of the first white balance setting picture and the second white balance setting picture) and the indication of the still picture on the first display 92a after the adjustment has been made to the white balance.

The optical finder 91 is a finder for observing the optical image of the photographing subject through the lens 51. By looking with one eye of the user, the optical finder 91 is also for observing the exposure condition set by the user or calculated by the photometric operation.

The first display 92a is an indicating apparatus that is arranged on the rear surface of the photographing apparatus 1 and indicates the image obtained by the photographing operation (including the still picture that is used for the preview indication operation). The first display 92 also indicates the information regarding the setting state of the white balance (the first and second white balance setting pictures).

The second display 92b is an indicating apparatus that is arranged on the top surface of the photographing apparatus 1 and indicates information about the function that is set in regard to the exposure condition, the image processing operation such as the white balance etc., and the storage operation.

The first display 92a indicates the first white balance setting picture or the second white balance setting picture that perform the information regarding the setting state of the white balance, based on the operation of the function key 15 and the left-direction key 16d of the direction keys 16.

Figure 6:
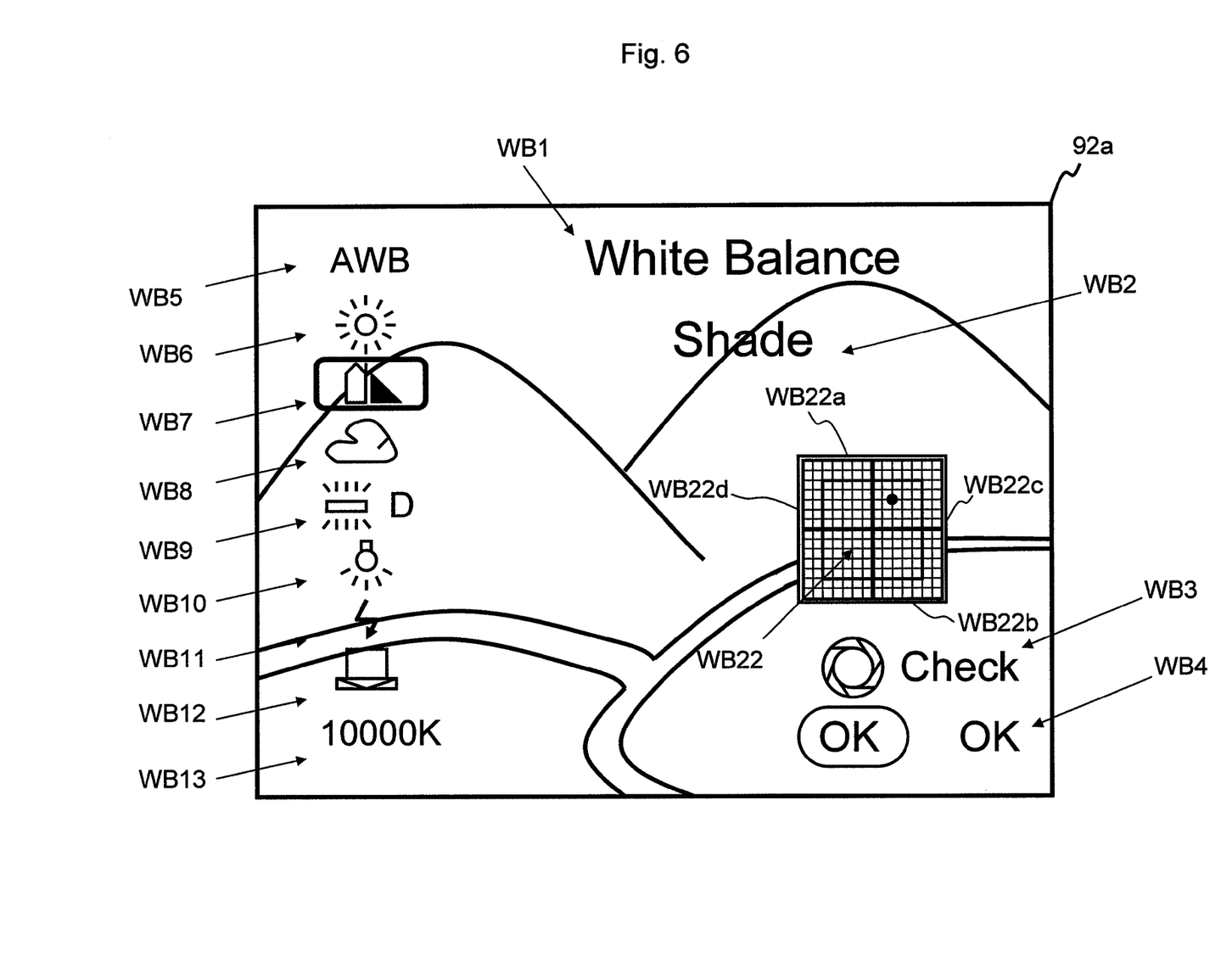
FIG. 6 is the display content of the first white balance setting picture and the preview image.

When the image data is temporarily stored in the buffer memory 80, the information regarding the setting state of the white balance (the first white balance setting picture, the second white balance setting picture) is indicated in the most recent image data in the preview indication operation on the first display 92a (on-screen indication, see FIGS. 6 and 8).

Figure 7:
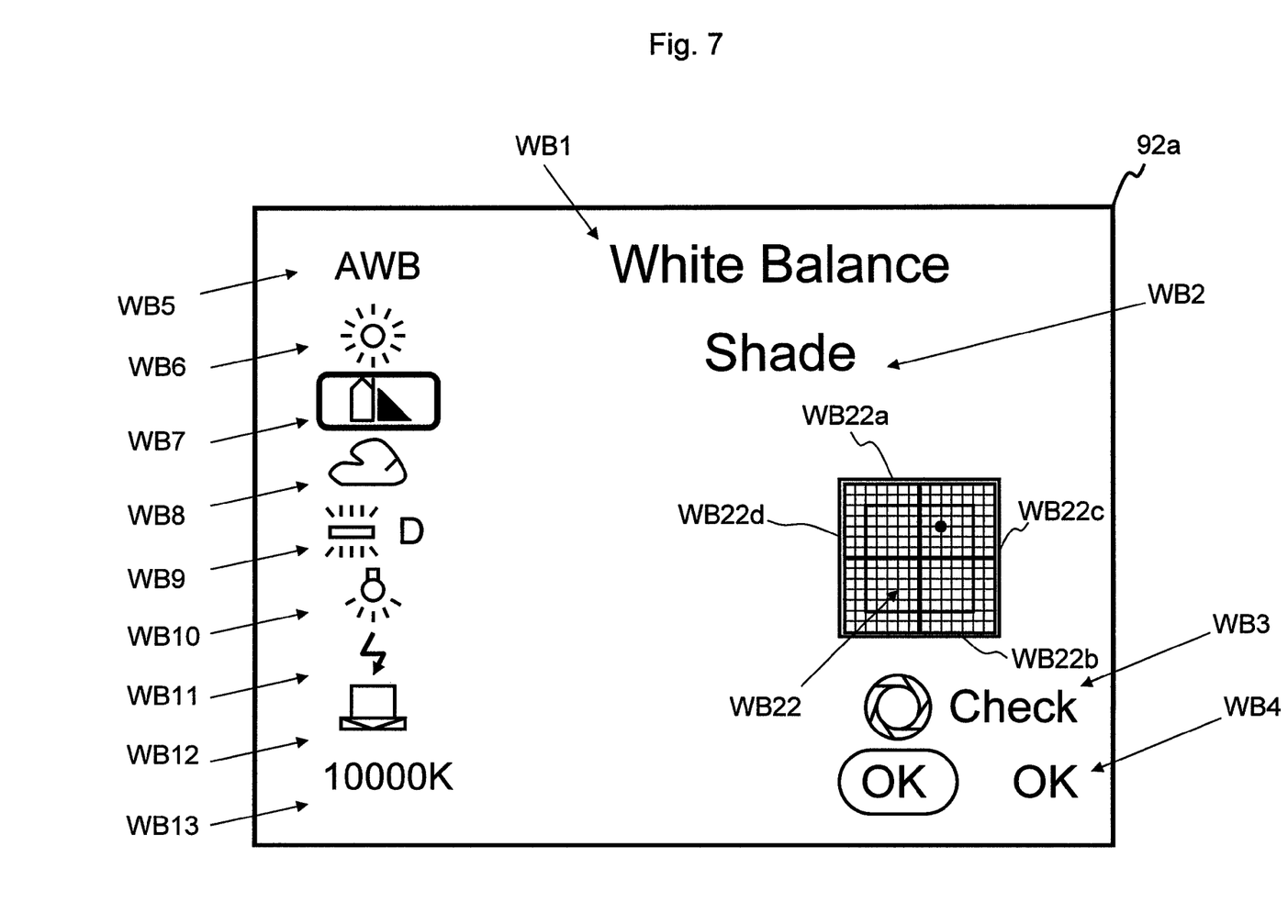
FIG. 7 is the display content of the first white balance setting picture without the preview image.

When the image data is not temporarily stored in the buffer memory 80, the information regarding the setting state of the white balance (the first white balance setting picture, the second white balance setting picture) is indicated without on-screen indication (see FIGS. 7 and 9).

When one of the direction keys 16 is operated under the condition where the information regarding the setting state of the white balance (the first white balance setting picture, the second white balance setting picture) is indicated, the setting state of the white balance is changed.

The first white balance setting picture has a white balance indication area WB1, a first selected mode indication area WB2, a preview command indication area WB3, a decision command indication area WB4, an AWB mode indication area WB5, a daylight mode indication area WB6, a shade mode indication area WB7, a cloudy mode indication area WB8, a fluorescent light mode indication area WB9, a tungsten light mode indication area WB10, a flash mode indication area WB11, a manual mode indication area WB12, a color temperature indication area WB13, and the adjustment quantity indication area WB22 (only the second white balance setting picture has the adjustment state indication area WB21, see FIGS. 6 and 7).

The white balance indication area WB1 displays a letter to indicate that the indication picture is in the setting state of the white balance.

The first selected mode indication area WB2 displays a letter to indicate a white balance mode that is selected by the user.

The preview command indication area WB3 displays an icon and a letter to indicate information regarding the command of the preview indication operation.

When the power supply lever 12 is rotated to the preview position under the condition where the first white balance indication setting picture is indicated, the photographing operation for temporarily storing the image data to the buffer memory 80 (the preview indication operation) is performed immediately.

The decision command indication area WB4 displays an icon and a letter to indicate information regarding the command of the decision key 17.

When the decision key 17 is depressed under the condition where the first white balance indication setting picture is indicated, the setting state of the white balance is determined and then the indication is switched from the first white balance setting picture to the function setting picture.

The AWB mode indication area WB5 displays a letter to indicate an auto white balance mode that automatically adjusts the white balance.

The daylight mode indication area WB6 displays an icon to indicate a daylight white balance mode that is used when taking pictures in sunlight.

The shade mode indication area WB7 displays an icon to indicate a shade white balance mode that is used when taking pictures in the shade.

The cloudy mode indication area WB8 displays an icon to indicate a cloudy white balance mode that is used when taking pictures on cloudy days.

The fluorescent light mode indication area WB9 displays an icon and a letter to indicate a fluorescent light white balance mode that is used when taking pictures under fluorescent lighting.

The tungsten light mode indication area WB10 displays an icon to indicate a tungsten light white balance mode that is used when taking pictures under a light bulb or other tungsten light.

The flash mode indication area WB11 displays an icon to indicate a flash white balance mode that is used when taking pictures using the built-in flash.

The manual mode indication area WB12 displays an icon to indicate a manual white balance mode that manually adjusts the white balance.

The color temperature indication area WB13 displays a numerical value to indicate a color temperature setting mode that the color temperature is set.

The adjustment quantity indication area WB22 consists of a cursor illustrating the quantity of the fine adjustment of the white balance and a two-dimensional coordinate plane illustrating the cursor's range of movement.

When at least one of the up-direction key 16*a* and the down-direction key 16*b* is depressed under the condition where the first white balance setting picture is indicated, the rectangular frame is moved to one of the AWB mode indication area WB5, the daylight mode indication area WB6, the shade mode indication area WB7, the cloudy mode indication area WB8, the fluorescent light mode indication area WB9, the tungsten light mode indication area WB10, the flash mode indication area WB11, the manual mode indication area WB12, and the color temperature indication area WB13, so that the white balance mode corresponding to the indication area with the rectangular frame is set as the selected white balance mode. Further, the name of the selected white balance mode is displayed in the first selected mode indication area WB2.

In FIGS. 6 and 7, the shade white balance mode is selected.

Figure 4:
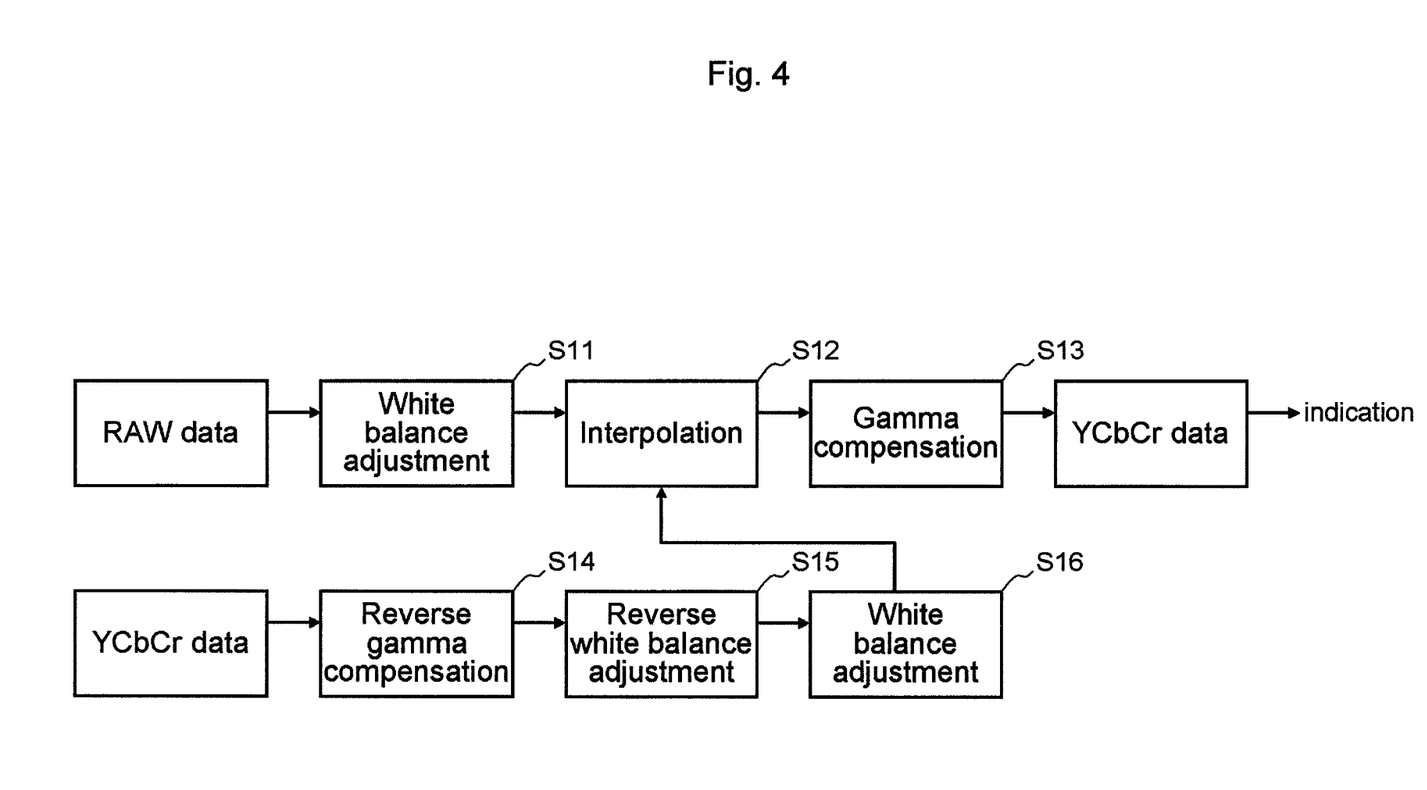
FIG. 4 is a flowchart that indicates the flow of the image data that is generated for the preview indication operation.

When the white balance mode is changed under the condition where the first white balance setting picture is indicated, the white balance adjustment made to the image data corresponding to the preview indication operation is fine-tuned on the basis of the white balance gain corresponding to the selected white balance mode (see step S16 in FIG. 4). The still picture on which the white balance adjustment is fine-tuned is superimposed with information regarding the setting state of the white balance (the first white balance setting picture), in other words, the first white balance setting picture is indicated on the still picture with the on-screen indication.

Therefore, the result of the white balance adjustment can be visually recognized.

When the power supply lever 12 is rotated to the preview position under the condition where the first white balance setting picture is indicated, the photographing operation is performed, the captured image data is temporarily stored in the buffer memory 80, and then the still picture corresponding to the temporarily stored image data is superimposed with information regarding the setting state of the white balance (the first white balance setting picture).

The still picture in this time is an image on which the white balance adjustment is fine-tuned using the white balance gain that was set on the basis of the selected white balance mode corresponding to the indication area with the rectangular frame on the first white balance setting picture.

When the decision key 17 is depressed under the condition where the first white balance setting picture is indicated, the white balance gain is determined on the basis of the selected white balance mode corresponding to the indication area with the rectangular frame on the first white balance setting picture. The indication is then switched from the first white balance setting picture to the function setting picture.

When the right-direction key 16*c* is depressed under the condition where the first white balance setting picture is indicated, the indication is switched from the first white balance setting picture to the second white balance setting picture (see FIGS. 8 and 9).

The second white balance setting picture has the first selected mode indication area WB2, the decision command indication area WB4, an adjustment state indication area WB21, the adjustment quantity indication area WB22, a reset command indication area WB23, a cancel command indication area WB24, a GM compensation value indication area WB25, a BA compensation value indication area WB26, and a second selected mode indication area WB27.

The adjustment state indication area WB21 illustrates a state where the fine adjustment is made to the white balance, by figure.

The reset command indication area WB23 displays an icon and a letter to indicate information regarding the command of the reset key 14.

When the reset key 14 is depressed under the condition where the second white balance indication setting picture is indicated, the fine adjustment made to the white balance is reset so that the cursor on the adjustment quantity indication area WB22 is moved to the point of origin.

The cancel command indication area WB24 displays an icon and a letter to indicate information regarding the command of the menu key 18.

When the menu key 18 is depressed under the condition where the second white balance indication setting picture is indicated, the indication is switched from the second white balance setting picture to the first white balance setting picture.

The GM compensation value indication area WB25 indicates an adjustment value of the tone of the colors between green and magenta that shows the quantity of the fine adjustment made to the white balance by using an up-direction arrow, a down-direction arrow, and a numerical value.

The BA compensation value indication area WB26 indicates an adjustment value of the tone of the colors between blue and amber that shows the quantity of the fine adjustment made to the white balance by using a right-direction arrow, a left-direction arrow, and a numerical value.

The second selected mode indication area WB27 displays an icon to indicate a white balance mode that is selected by the user and displays a letter to indicate that this picture is used for the fine-adjustment made to the white balance.

When one of the up-direction key 16a, the down-direction key 16b, the right-direction key 16c, or the left-direction key 16d is depressed under the condition where the second white balance setting picture is indicated, the cursor on the adjustment quantity indication area WB22 is moved so that the fine adjustment is made to the white balance on the basis of the white balance gain corresponding to the selected white balance mode and the position of the cursor.

Specifically, the tone of the green color is strengthened by depressing the up-direction key 16a, the tone of the magenta color is strengthened by depressing the down-direction key 16b, the tone of the amber color is strengthened by depressing the right-direction key 16c, and the tone of the blue color is strengthened by depressing the left-direction key 16d.

The adjustment state indication area WB21 has a first adjustment state indication area WB21a, a second adjustment state indication area WB21b, a third adjustment state indication area WB21c, and a fourth adjustment state indication area WB21d.

The first adjustment state indication area WB21a has an arc shape and is arranged on the upper side of the adjustment quantity indication area WB22.

The second adjustment state indication area WB21b has an arc shape and is arranged on the lower side of the adjustment quantity indication area WB22.

The third adjustment state indication area WB21c has an arc shape and is arranged on the right side of the adjustment quantity indication area WB22.

The fourth adjustment state indication area WB21d has an arc shape and is arranged on the left side of the adjustment quantity indication area WB22.

The first, second, third, and fourth adjustment state indication areas WB21a, WB21b, WB21c, and WB21d approximately form a circular shape that surrounds the adjustment quantity indication area WB22.

On the second white balance setting picture, the adjustment state indication area WB21 is indicated (see FIGS. 8 and 9). When the decision key 17 is depressed under the condition of the second white balance setting picture, the indication is switched from the second white balance setting picture to the first white balance setting picture so that the adjustment state indication area WB21 is not indicated on the first white balance setting picture (see FIGS. 6 and 7).

Therefore, it can be easily and visually recognized whether or not the fine adjustment is made to the white balance by confirming whether the adjustment state indication area WB21 is indicated or not.

The first adjustment state indication area WB21a has green color, the second adjustment state indication area WB21b has magenta color, the third adjustment state indication area WB21c has amber color, and the fourth adjustment state indication area WB21d has blue color.

The adjustment quantity indication area WB22 consists of the cursor illustrating the quantity of the fine adjustment made to the white balance, and the two-dimensional coordinate plane illustrating the cursor's range of movement.

A square-shaped frame that constitutes an external form of the two-dimensional coordinate plane has an upper-side part WB22a, a lower-side part WB22b, a right-side part WB22c, and a left-side part WB22d.

The inside of the two-dimensional coordinate plane has a color constitution that does not transmit. For example, the inside of the two-dimensional coordinate plane consists of a grid of black lines on a white background, or a grid of white lines on a black background. Therefore, the part of the image that is superimposed with the first (second) white balance setting picture that overlaps the two-dimensional coordinate plane is not indicated.

The upper-side part WB22a has green color at the center in the horizontal direction. It has a color gradation with the amount of amber color increasing in the right direction from the green color at the horizontal center, and it has a color gradation with the amount of blue color increasing in the left direction from the green color at the horizontal center.

The lower-side part WB22b has magenta color at the center in the horizontal direction. It has a color gradation with the amount of amber color increasing in the right direction from the magenta color at the horizontal center, and it has a color gradation with the amount of blue color increasing in the left direction from the magenta color at the horizontal center.

The right-side part WB22c has amber color at the center in the vertical direction. It has a color gradation with the amount of green color increasing in the upper direction from the amber color at the vertical center, and it has a color gradation with the amount of magenta color increasing in the lower direction from the amber color at the vertical center.

The left-side part WB22d has blue color at the center in the vertical direction. It has a color gradation with the amount of green color increasing in the upper direction from the blue color at the vertical center, and it has a color gradation with the amount of magenta color increasing in the lower direction from the blue color at the vertical center.

The upper-side part WB22a has a color gradation whose right side color is close to the central color of the right-side part WB22c that is adjacent to the upper-side part WB22a, and whose left side color is close to the central color of the left-side part WB22d that is adjacent to the upper-side part WB22a.

The lower-side part WB22b has a color gradation whose right side color is close to the central color of the right-side part WB22c that is adjacent to the lower-side part WB22b, and whose left side color is close to the central color of the left-side part WB22d that is adjacent to the lower-side part WB22b.

The right-side part WB22c has a color gradation whose upper side color is close to the central color of the upper-side part WB22a that is adjacent to the right-side part WB22c, and whose lower side color is close to the central color of the lower-side part WB22b that is adjacent to the right-side part WB22c.

The left-side part WB22d has a color gradation whose upper side color is close to the central color of the upper-side part WB22a that is adjacent to the left-side part WB22d, and whose lower side color is close to the central color of the lower-side part WB22b that is adjacent to the left-side part WB22d.

Therefore, the tone of the color that is strengthened by moving the cursor on the two-dimensional coordinate plane of the adjustment quantity indication area WB22 can be easily recognized visually by the color constitution of the first, second, third, and fourth adjustment state indication areas WB21a, WB21b, WB21c, and WB21d, the upper-side part WB22a, the lower-side part WB22b, the right-side part WB22c, and the left-side part WB22d.

When the fine adjustment is made to the white balance under the condition where the second white balance setting picture is indicated, the white balance adjustment, including the fine adjustment, made to the image data corresponding to the preview indication operation is fine-tuned on the basis of the white balance gain that corresponds to the selected white balance mode and the position of the cursor in the adjustment quantity indication area WB22. The still picture on which the white balance adjustment including the fine adjustment is tuned, is superimposed with information regarding the setting state of the white balance (the second white balance setting picture), in other words, the second white balance setting picture is indicated on the still picture with the on-screen indication.

When the power supply lever 12 is rotated to the preview position under the condition where the second white balance setting picture is indicated, the photographing operation is performed, the captured image data is temporarily stored in the buffer memory 80, and the still picture corresponding to the temporarily stored image data is then superimposed with information regarding the setting state of the white balance (the second white balance setting picture).

The still picture in this time is an image on which the white balance adjustment, including the fine adjustment, using the white balance gain set on the basis of the selected white balance mode and the position of the cursor in the adjustment quantity indication area WB22 is tuned.

When the decision key 17 is depressed under the condition where the second white balance setting picture is indicated, the white balance gain, including the fine adjustment quantity, is determined on the basis of the selected white balance mode and the position of the cursor in the adjustment quantity indication area WB22. The indication is then switched from the second white balance setting picture to the first white balance setting picture.

When the menu key 18 is depressed under the condition where the second white balance setting picture is indicated, the indication is switched from the second white balance setting picture to the first white balance setting picture without determining the quantity of the fine adjustment made to the white balance in the selected white balance mode on the basis of the position of the cursor in the adjustment quantity indication area WB22 on the second white balance setting picture.

Next, a flow of the image data that is generated for the preview indication operation is explained by using the flowchart in FIG. 4.

When the power supply lever 12 is rotated to the preview position, the photographing operation is performed under the exposure condition set by the user or calculated by the photometric operation so that the RAW data is generated.

In step S11, an adjustment is made to the white balance of the RAW data. In step S12, a color interpolation operation is performed. In step S13, gamma compensation is performed. Adjustments made to tone curve, sharpness, and chromaticness are carried out in step S13.

After step S13, YCbCr data is generated. The YCbCr data is image data that is used for the preview indication operation, and is temporarily stored in the buffer memory 80.

In the case where the RAW data that is stored in the memory unit 70 is used for the preview indication operation, the same operations in steps S11 to S13 are performed.

In the case where the newly set white balance gain is multiplied by the YCbCr data temporarily stored in the buffer memory 80, a reverse gamma compensation that returns it to its previous state before the gamma compensation, is performed in step S14.

Further, a reverse adjustment made to the tone curve and chromaticness is fine-tuned so that the YCbCr data is returned to its previous state before the original fine-tuned adjustment was made to the tone curve and chromaticness.

In step S15, a reverse adjustment made to the white balance is fine-tuned so that the YCbCr data is returned to its previous state before the original fine-tuned adjustment was made to the white balance; in other words, before the white balance gain is multiplied.

In step S16, the adjustment made to the newly set white balance is fine-tuned, and then the operation proceeds to step S12.

Figure 5:
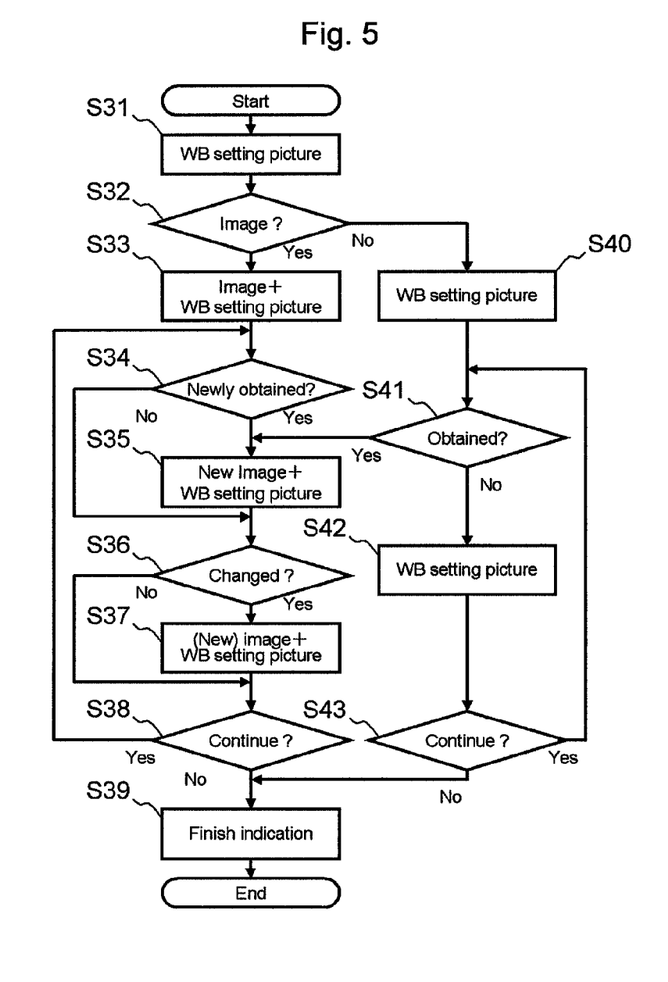
FIG. 5 is a flowchart that indicates the flow when the white balance gain is set.

Next, a flow for setting the white balance gain is explained by using the flowchart in FIG. 5.

In step S31, for indicating the first white balance setting picture (or the second white balance setting picture), the function key 15 and the left-direction key 16d of the direction keys 16 are operated.

In step S32, it is determined whether image data (the YCbCr data) is temporarily stored in the buffer memory 80. When it is determined that there is image data in the buffer memory 80, the operation continues to step S33. Otherwise, the operation proceeds directly to step S40.

In step S33, the still picture corresponding to the temporarily stored image data is indicated on the first display 92a so that the first white balance setting picture (or the second white balance setting picture) is indicated on the still picture with the on-screen indication (see steps S14 to S16, S12, and S13 in FIG. 4).

In step S34, it is determined whether the power supply lever 12 is moved to the preview position so that the image data for the preview indication operation is newly obtained. When it is determined that the power supply lever 12 is moved to the preview position so that the image data for the preview indication operation is newly obtained, the operation continues to step S35. Otherwise, the operation by-passes step S35 and proceeds directly to step S36.

In step S35, the still picture based on the newly obtained image data is indicated on the first display 92a so that the first white balance setting picture (or the second white balance setting picture) is indicated on the still picture with the on-screen indication (see steps S11 to S13 in FIG. 4).

In step S36, it is determined whether the parameter regarding the white balance has been changed, or the operation for changing the white balance gain has been performed. Specifically, when the first white balance setting picture is indicated, a determination is made as to whether the white balance mode has been changed. When the second white balance setting picture is indicated, a determination is made as to whether the quantity of the fine adjustment of the white balance of the selected white balance mode has been changed.

When it is determined that the parameter regarding the white balance has been changed, the operation continues to step S37. Otherwise, the operation by-passes step S37 and proceeds directly to step S38.

In step S37, the white balance of the image data corresponding to the still picture that is indicated in step S33 or S35 is fine-tuned on the basis of the newly set white balance gain, and the still picture whose white balance has been fine-tuned is then indicated on the first display 92a so that the first white balance setting picture (or the second white balance setting picture), whose parameter regarding the white balance has been changed, is indicated on the still picture with the on-screen indication (see steps S14 to S16, S12, and S13 in FIG. 4).

In step S38, it is determined whether setting the white balance gain is continued; in other words, one of either the decision key 17 or the menu key 18 is depressed.

When it is determined that neither the decision key 17 nor the menu key 18 are depressed, setting the white balance gain is continued and the operation is returned to step S34.

When it is determined that one of either the decision key 17 or the menu key 18 is depressed, setting the white balance gain is finished and the operation continues to step S39.

In step S40, the first white balance setting picture (or the second white balance setting picture) is indicated on the first display 92a without indicating the still picture.

In step S41, it is determined whether the power supply lever 12 is moved to the preview position so that the image data for the preview indication operation is newly obtained. When it is determined that the power supply lever 12 is moved to the preview position so that the image data for the preview indication operation is newly obtained, the operation is returned to step S35. Otherwise, the operation continues to step S42.

In step S42, the first white balance setting picture (or the second white balance setting picture) is indicated on the first display 92a without indicating the still picture. In this time, even if the parameter regarding the white balance has changed, the still picture is not tuned regarding the white balance.

In step S43, it is determined whether setting the white balance gain is continued; in other words, one of either the decision key 17 or the menu key 18 is depressed.

When it is determined that neither the decision key 17 nor the menu key 18 are depressed, setting the white balance gain is continued and the operation is returned to step S41.

When it is determined that one of either the decision key 17 or the menu key 18 is depressed, setting the white balance gain is finished and the operation is returned to step S39.

In the embodiment, when the setting for the white balance gain is fine-tuned, the preview indication operation can be performed by using the still picture. Therefore, the setting for the white balance gain that is suitable to the photographing subject on which the photographing operation will be performed, can be fine-tuned while looking at the preview image.

The preview indication operation can use the moving picture, when the setting for the white balance gain is fine-tuned. However, because the moving picture is different from a picture of the photographing subject on which the photographing operation will be performed, it is difficult to accurately set the white balance gain that is suitable to the photographing subject. Further, because the photographic subject image is always captured by the imaging sensor 53, the temperature of the imaging sensor 53 increases when obtaining the moving picture, which may increase the noise.

The RAW data or the YCbCr data that is stored in the memory unit 70 may be used as the image data for the preview indication on the first display 92a.

Further, before storage in the memory unit 70 or the buffer memory 80, the image data may be used as the image data for the preview indication on the first display 92a.

Further, the white balance setting picture of the white balance gain including the fine adjustment is used as the setting picture in the embodiment. However, another setting picture regarding another image processing operation, that converts from the RAW data to the YCbCr data that can be indicated as the still image, such as adjustments of tone curve, sharpness, and chromaticness may used as the setting picture.

Further, the information such as the first white balance setting picture and the second white balance setting picture is indicated on the still picture with the on-screen indication. However, this information may be indicated on another part of the photographing apparatus 1, such as on the second display 92b, or on a key of the operation unit 10, etc.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2006-247959 (filed on Sep. 13, 2006), which is expressly incorporated herein by reference, in its entirety.

The invention claimed is:

1. A photographing apparatus comprising:
an imaging sensor that obtains image data;
a memory that stores said image data; and
a display unit that displays a still picture based on said image data and a white balance setting picture on said still picture, said white balance setting picture being used for setting a white balance gain in a white balance adjustment,
wherein, while said white balance setting picture is displayed by said display unit, said still picture which is displayed by said display unit is updated when said imaging sensor obtains new image data in response to a user operation, and a white balance of said updated still picture is adjusted.

2. The photographing apparatus according to claim 1, wherein said image data is RAW data; and
said memory stores said RAW data or YCbCr data that is converted from said RAW data, as said image data.

3. The photographing apparatus according to claim 1, further comprising an operation unit that is used for changing said white balance gain while said display unit displays said white balance setting picture;
wherein when said white balance gain is changed by operating said operation unit, said display unit displays said still picture after an adjustment corresponding to said white balance gain that is changed by said operation unit has been made to the white balance.

4. The photographing apparatus according to claim 1, further comprising an operation unit that is used for commanding a photographing operation for obtaining said image data;
wherein said operation unit is a power supply lever;
when said power supply lever is rotated to an ON position, said photographing apparatus is set to an ON state;
when said power supply lever is rotated to an OFF position, said photographing apparatus is set to an OFF state; and
when said power supply lever is rotated to a preview position, said photographing operation for obtaining said image data is performed.

5. The photographing apparatus according to claim 1, wherein the user operation is commanding a still photographing operation.

6. A photographing apparatus comprising:
an imaging sensor that obtains first image data;
a memory that stores said first image data; and
a display unit that displays a still picture based on said first image data and an image processing setting picture on said still picture, said image processing setting picture being used for setting a quantity of adjustment in an image processing operation that converts said first image data to second image data that can be indicated on said display unit as said still picture,
wherein, while said image processing setting picture is displayed by said display unit, said still picture which is displayed by said display unit is updated when said imaging sensor obtains new first image data in response to a user operation, and a quantity of adjustment of said updated still picture is set in said image processing operation.

7. The photographing apparatus according to claim 6, wherein said image processing operation is at least one of a white balance adjustment, a tone curve adjustment, a sharpness adjustment, and a chromaticness adjustment.

8. The photographing apparatus according to claim 6, wherein the user operation is commanding a still photographing operation.

9. A photographing apparatus comprising:
an imaging sensor that obtains image data; and
a display unit that displays a still picture based on said image data and a white balance setting picture on said still picture, said white balance setting picture being used for setting a white balance gain in a white balance adjustment,
wherein, while said white balance setting picture is displayed by said display unit, said still picture which is displayed by said display unit is updated when said imaging sensor obtains new image data in response to a user operation, and a white balance of said updated still picture is adjusted.

10. The photographing apparatus according to claim 9, wherein the user operation is commanding a still photographing operation.

11. A photographing apparatus comprising:
an imaging sensor that obtains image data;
an operation unit that is used for changing a white balance gain; and
a display unit that displays a still picture based on said image data;
wherein when said white balance gain is changed by operating said operation unit, said display unit displays said still picture after an adjustment corresponding to said white balance gain that is changed by said operation unit has been made to the white balance, and
said still picture which is displayed by said display unit is updated when said imaging sensor obtains new image data in response to a user operation, and a white balance of said updated still picture is adjusted.

12. The photographing apparatus according to claim 11, wherein the user operation is commanding a still photographing operation.

* * * * *